US008806005B2

(12) United States Patent
Miri et al.

(10) Patent No.: US 8,806,005 B2
(45) Date of Patent: Aug. 12, 2014

(54) CROSS-MACHINE EVENT LOG CORRELATION

(75) Inventors: Seyedeh Pardis Miri, La Jolla, CA (US); Pankaj Garg, Bellevue, WA (US); Benjamin Schultz, Bellevue, WA (US); Sandeep Kishan Singhal, Kirkland, WA (US); Madhan Sivakumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 13/230,706

(22) Filed: Sep. 12, 2011

(65) Prior Publication Data

US 2013/0067067 A1    Mar. 14, 2013

(51) Int. Cl.
G06F 15/173    (2006.01)
H04L 12/24     (2006.01)
H04L 12/64     (2006.01)
G06F 9/455     (2006.01)

(52) U.S. Cl.
CPC .......... *H04L 12/6418* (2013.01); *H04L 41/069* (2013.01); *G06F 9/45533* (2013.01)
USPC ............................. 709/224; 709/200; 726/25

(58) Field of Classification Search
USPC .................... 709/224, 200; 726/25
See application file for complete search history.

(56) References Cited

U.S. PATENT DOCUMENTS 6,914,910 B1 *  7/2005  Van Renesse et al. ........ 370/466
6,922,417 B2    7/2005  Vanlint
7,131,113 B2   10/2006  Chang et al.
7,210,071 B2    4/2007  Deacon et al.
7,640,539 B2   12/2009  Alexander, III et al.
2004/0260804 A1 * 12/2004 Grabarnik et al. ............ 709/224
2006/0225073 A1  10/2006  Akagawa et al.
2007/0143842 A1 *  6/2007  Turner et al. .................... 726/22
2008/0196043 A1   8/2008  Feinleib et al.
2009/0248611 A1  10/2009  Xu et al.
2010/0128623 A1   5/2010  Dunn et al.
2010/0223446 A1   9/2010  Katariya et al.
2010/0318990 A1  12/2010  Hou et al.
2010/0322237 A1  12/2010  Raja et al.

OTHER PUBLICATIONS

"Event Tracer", Cisco IOS Software Releases 12.0 S, Cisco Systems, retrieved on Aug. 30, 2011 from <<http://www.cisco.com/en/US/docs/ios/12_0s/feature/guide/evnttrcr.html>>, 11 pages.
Park, et al., "Event Tracking, Improve Debugging and Performance Tuning with ETW", retrieved from <<http://msdn.microsoft.com/en-us/magazine/cc163437.aspx>> on Aug. 25, 2011, Microsoft, 2011, 13 pages.
PCT International Search Report and Written Opinion in International Application PCT/US2012/054389, mailed Feb. 5, 2013, 9 pgs.
European Communication in Application 12831218.8, mailed Apr. 22, 2014, 3 pgs.

* cited by examiner

*Primary Examiner* — El Hadji Sall
(74) *Attorney, Agent, or Firm* — John Jardine; Andrew Sanders; Micky Minhas

(57) ABSTRACT

In computing environments having multiple computers, where such computers may comprise virtual machines, events are logged in association with corresponding activity identifiers. When a data packet associated with an activity is transferred to a destination machine, the activity identifier corresponding to the activity is transferred along with the data packet and used by the destination machine when logging its events. This allows events from the two machines to be correlated according to the activities to which they pertain.

20 Claims, 6 Drawing Sheets

CROSS-MACHINE EVENT LOG CORRELATION

BACKGROUND

Network communications and other computer input/output (I/O) operations are often implemented using multiple protocols. Low-level protocols typically interact with device hardware or transport media, and high-level protocols typically interact with software applications. A series of protocol processing components from lower-level protocols to higher-level protocols, is referred to as a protocol stack, and each component within the stack is referred to as a protocol layer. A data object such as an I/O packet is typically passed serially through the layers of a protocol stack as it is transferred between an application and a physical transport mechanism.

As an example, a network communications protocol stack may include the following protocols and corresponding layers:

| Protocol | Layer |
|---|---|
| HTTP | Application |
| TCP | Transport |
| IP | Internet |
| Ethernet | Link |
| IEEE 802.3u | Physical |

For purposes of debugging and troubleshooting, it is often useful to trace the progress of a single data packet through the protocol stack. Some operating systems allow the protocol layers to report or log events related to packet processing, and some operating systems may support repositories, APIs (application programming interfaces), reporting tools, and other central functionality to facilitate event reporting and logging.

Generally, each layer of the protocol stack is isolated from other layers of the stack. However, data packets passed between the layers may include so-called "out-of-band" data, in addition to the actual I/O data. In order to trace a particular data packet through the protocol stack, an identifier may be associated with the data packet, and passed from layer to layer in the out-of-band data associated with the data packet. When logging an event, each layer reports the packet identifier to the logging system along with other information about the event. This allows reporting services to gather all logged events relating to a single packet, and to reconstruct a trace that shows how the packet is handled as it traverses the protocol stack. This method can be used with activities of various types, so that all events occurring within a protocol stack that are related to a single activity can be easily identified.

The increasing use of virtualization in computing environments has introduced challenges relating to diagnostics and troubleshooting. In a virtual computing environment, a single physical machine may host a number of virtual machines. Each machine, including the host machine and the virtual machines, may have its own operating system and implement its own protocol stacks. Furthermore, each of the protocol stacks may operate independently of other protocol stacks, and there is no convenient way to correlate the events reported from one protocol stack to those reported from another protocol stack.

SUMMARY

This disclosure describes methods of reporting, event logging, and inter-machine communications that allow activity-related events to be traced through the protocol stacks of multiple computers, which may include both physical machines and virtual machines. A data packet associated with a particular activity is associated with one or more activity identifiers. The activity identifiers are in turn associated with any events that are reported or logged in conjunction with the activity. When the data packet is transferred from one machine to another or from one protocol stack to another, an activity code is attached to the data packet by the originating protocol stack, and used or reported by the protocol stack of the recipient protocol stack when logging events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
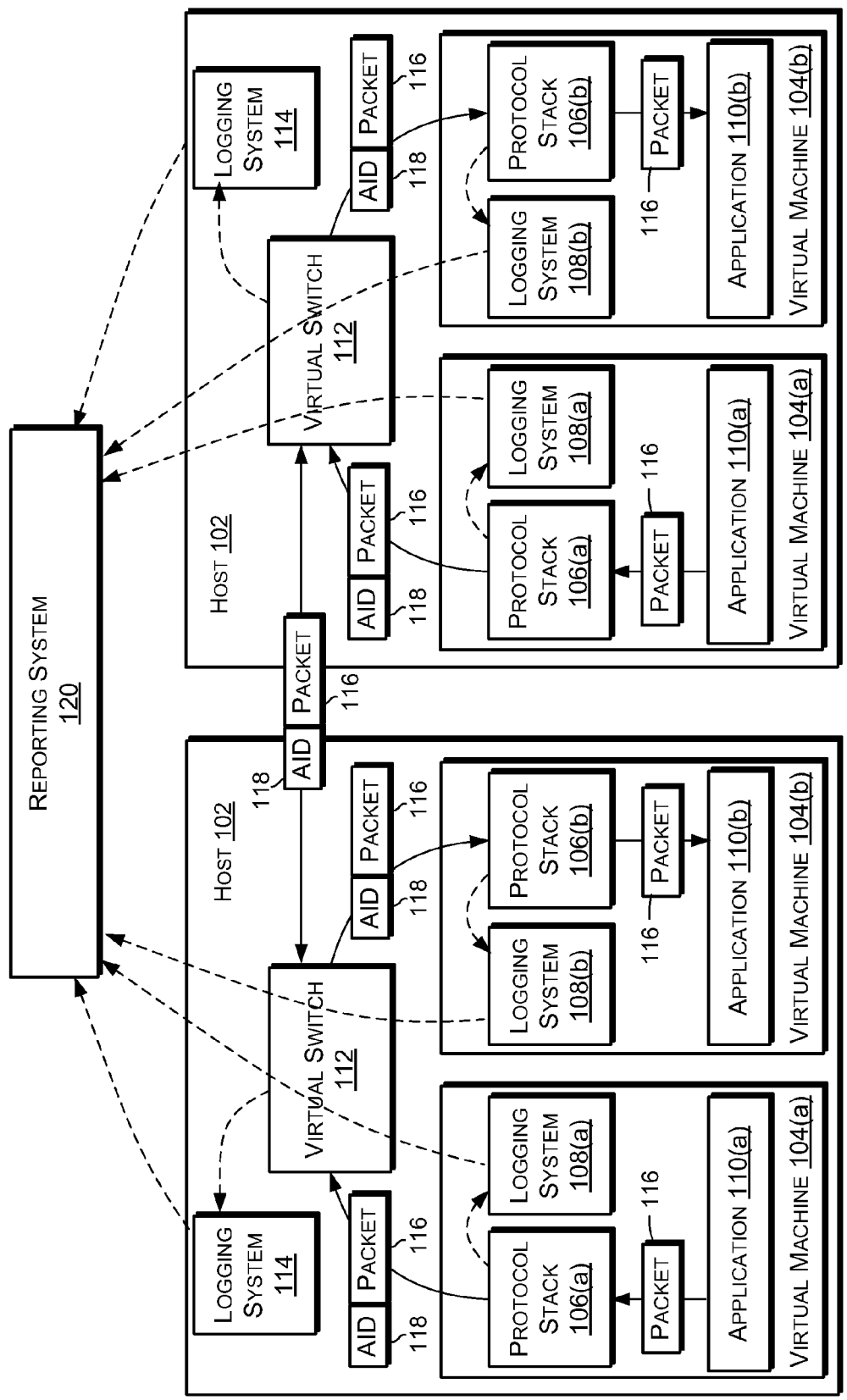
FIG. 1 is a block diagram illustrating techniques for correlating events that are reported from different protocol stacks and/or different machines.

FIG. 1 shows a virtual computing environment 100, with elements and components most relevant to event logging, inter-machine communications, and I/O protocol stack processing. The environment contains one or more virtual machine hosts 102. For ease of description, two hosts 102 are shown in FIG. 1, both of which are shown with common reference numerals.

Each host 102 may implement one or more virtual machines 104(a) and 104(b). Similar components of the two illustrated virtual machines 104 within each host 102 are shown with the same reference numerals, differentiated by the suffixes (a) and (b). Components of the first virtual machine 104(a) are shown in each example with the appended suffix (a). Components of the second virtual machine 104(b) are shown in each example with the appended suffix (b). The suffixes may be omitted at times in the following discussion for ease of discussion, when referring to either or both referenced components.

Each virtual machine 104 has an independent operating system (not shown), which implements a protocol stack 106. The virtual machine 104 and/or its operating system may also implement a logging system 108, to which various different components of the virtual machine 104 may report events that may be of interest to analysts. Different types of errors may be reported by the components, as well as other types of events.

One or more applications 110 may be executed by each of the virtual machines 104. The term "application" in this environment refers to a high-level component that executes within the virtual machine 104 and that is a consumer and/or producer with respect to the protocol stack 106. The application 110 may interact with the upper level of the protocol stack 106 to send and receive data packets or other I/O. The application 110 may utilize the logging system 108 to report errors and events.

The host 102 also has an operating system (not shown) which implements various functionality to support the operations of its virtual machines 104, including various I/O protocol stacks for facilitating communications between both virtual machines and other physical machines. As a relevant example, the host 102 may implement a virtual network switch 112, which may use one or more protocol stacks to emulate the function of a physical network switch and to provide communications with the virtual machines 104 of the host 102. The lowest-level protocol layer of the virtual machine protocol stack 106 communicates with the virtual switch 112 to pass data packets between the virtual machine 104 and the host 102. The virtual switch 112 may also facilitate communications with other physical machines and/or hosts, using the same or additional protocol stacks. In some implementations, a data packet may be communicated through multiple protocol stacks implemented by a single machine such as the host 102.

The host 102 and/or its operating system may maintain their own logging system 114. The virtual switch 112 and other executable components of the host 102 may report errors and other processing events to the host logging system 114.

Within each of the hosts 102, an example flow of a data packet 116 is illustrated by solid lines, with arrow heads indicating the direction of data transfer. The example assumes that a packet 116 originates within a first of the virtual machines 104(a) and is transferred to a second of the virtual machines 104(b) through the virtual switch 112 of the host 102. More specifically, the application 110(a) of the first machine 104(a) generates the packet 116 and submits the packet to the protocol stack 106(a). The protocol stack 106(a) processes the data packet 116 through its protocol layers and then transfers the data packet 116 to the virtual switch 112 along with an activity identifier (AID) 118.

The virtual switch 112 of the host 102 receives the data packet 116 and associated activity identifier 118 and performs various processing using the layers of one or more protocol stacks that are implemented within the host 102. The activity identifier 118 (or a related activity identified as described below) remains associated with the data packet 116 during this processing. Eventually, the virtual switch 112 transmits the packet 116 and the activity identifier 118 to the protocol stack 106(b) of the virtual machine 104. The protocol stack 106(b) processes the packet 116 and eventually provides it to the application 110(b).

Data may be transferred between the two hosts 102 in the same manner, using appropriate network protocols over a physical communications network. When transferring the data packet 116 between hosts, the activity identifier 118 may be associated and transmitted with the packet to correlate activities between the hosts 102 and their virtual machines 104. For example, the activity identifier 118 may be associated with the data packet 116 as it is transferred from the virtual machine of one host to the virtual machine of another host.

Dashed lines in FIG. 1 indicate logging activities and communications. During processing of the packet 116, the individual layers of the protocol stack 106(a) report relevant events to the logging system 108(a), and the individual layers of the protocol stack 106(b) report relevant events to the logging system 108(b). Similarly, components or protocol layers of the virtual switch 112 report events to the logging system 114 of the host 102.

When an event relating to the processing of the data packet 116 is reported to any of the logging systems 108 and 114, the event specifies the activity identifier 118 that has been associated with the data packet 116.

A reporting system 120 may be used by administrators and/or technicians to analyze the processing of the packet 116 as it traverses the protocol stacks of the two virtual machines 104. The reporting system 120 may be implemented by one of the virtual or physical machines described above, or by an independent computer or machine. The reporting system 120 has access to the logging systems 108 of the virtual machines 104 and to the logging system 114 of the host 102, and can therefore obtain descriptions of events that have been logged from the virtual machines 104 and/or the host 102.

Events can be filtered by their activity identifiers 118 to gather events related to a single activity or data transfer. In addition to identifying and correlating events relating to common activities, the reporting system 120 may prepare time-based reports, indicating chronologies of processing events that have occurred in various machines with respect to individual data packets or to various types of activities.

Figure 2:
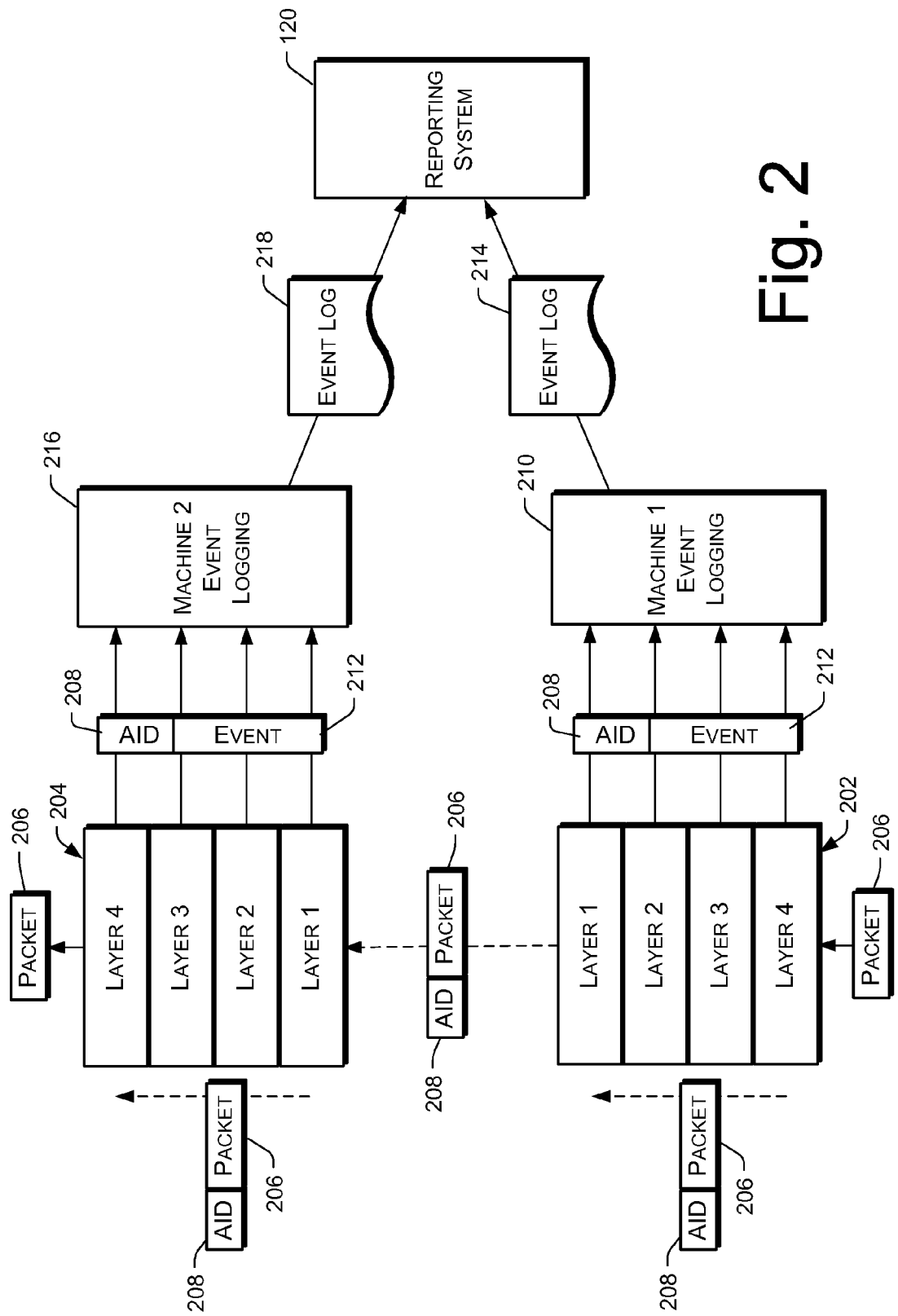
FIG. 2 is a block diagram that further illustrates techniques for correlating events from different protocol stacks and/or different machines.

FIG. 2 illustrates an example of how a data packet may be associated with an activity identifier and transferred between two machines in a manner that allows cross-machine tracing of events related to the activity represented by the data packet. The two machines may be two virtual machines, two physical machines, or a combination of a virtual machine and a physical machine or host. Each of the machines may be under the control of its own operating system, and each operating system may support its own protocol stacks and logging subsystems.

FIG. 2 illustrates a first protocol stack 202 that is implemented by a first machine, and a second protocol stack 204 that is implemented by a second machine. For example, the protocol stacks may be implemented by the virtual machine 104(a) and the host 102 of FIG. 1, or by any other combination of machines illustrated in FIG. 1. Each of the protocol stacks 202 and 204 has multiple processing layers, labeled in FIG. 2 as Layer 1, Layer 2, Layer 3, and Layer 4.

The first protocol stack 202 receives a data packet 206 at the highest protocol layer, which in this example is Layer 4. Each of the processing layers may be an independent processing component. Intermediate layers receive the packet 206 from the next higher layer, and pass it on to the next lower layer until reaching the lowest layer, which is Layer 1 in this example. The lowest layer is typically at the physical media layer, and communicates with a corresponding layer of another protocol stack over a physical media. In this case, Layer 1 of the first protocol stack 202 communicates with Layer 1 of the second protocol stack 204.

In certain embodiments, each layer of the protocol stacks 202 and 204 is configured to associate an activity identifier 208 with the packet 206. The activity identifier may be a GUID (globally unique identifier) or other code that is unique for each different packet that is processed by the protocol stacks.

The first layer to receive the packet 206 (Layer 4 of stack 202 in this example) may create the activity identifier 208 and provide an initial association of the activity identifier 208 with the packet 206. When passing the packet to a subsequent layer of the same protocol stack, the activity identifier may also be transferred, such by including the activity identifier in out-of-band data associated with the data packet 206. For example, a protocol stack may utilize memory buffers for storing data packets, and portions of the buffers may be used for storing activity identifiers.

As each layer of the first protocol stack 202 executes, it may communicate with an event logging system 210. The event logging system 210 may be maintained by the operating system or other component of the machine upon which the protocol stack 202 is implemented, and may be accessible through standardized and published APIs (application programming interfaces). Each layer may report various types of events 212, including errors, processing exceptions, and diagnostic information.

When a layer of the first protocol stack 202 reports an event 212 relating to the packet 206, it also reports the activity identifier 208 that has been associated with the packet 206. The event logging system 210 receives the event 212, including the associated activity identifier 208, and stores an event description in an event log 214. The stored event description includes the activity identifier 208.

At some point the packet 206 is passed from Layer 1 of the first protocol stack 202 to Layer 1 of the second protocol stack 204. This transfer between machines may be performed using different inter-machine protocols, such as NDIS (Network Driver Interface Specification), RNDIS (Remote Network Driver Interface Specification), ODI (Open Data-Link Interface), UDI (Uniform Driver Interfaced), GRE (Generic Routing Encapsulation), and so forth.

RNDIS is an example of a protocol that may be used at Layer 1 for transfer between a host machine and a virtual machine. When using RNDIS, the activity identifier 208 may be included as a label/value pair within the RNDIS payload.

GRE is an example of a protocol that may be used at Layer 1 for transfer between two physical machines, such as between a host machine and another physical machine or between two host machines. When using GRE, the activity identifier 208 may be embedded in an otherwise unused data field defined by the GRE specification. For example, the 32-bit "Key" or "Sequence Number" fields, specified by the GRE specification as part of the packet header, may be used to store the activity identifier 208 during transmission of the packet 206 from one physical machine to another.

After receiving the data packet 206, the second protocol stack 204 functions in the same way as the first protocol stack 202. As each layer of the second protocol stack 204 executes, it may communicate with an event logging system 216 maintained by the operating system or other component of the machine upon which the protocol stack 204 is implemented.

When a layer of the second protocol stack 204 reports an event 212 relating to the packet 206, it also reports the activity identifier 208 that has been associated with the packet 206. The event logging system 216 receives the event 212, including the associated activity identifier 208, and stores an event description in an event log 218. The stored event description includes the activity identifier 208.

Each layer of the protocol stacks 202 and 204 may simply pass the same activity identifier 208 to subsequent stack layers. That is, a common activity identifier may be assigned to the data packet by each of the stack layers of the protocol stacks 202 and 204. Alternatively, in some embodiments, any stack layer may assign a new activity identifier 208 to the data packet 206. In this case, the stack layer may report the assignment of the new activity identifier 208 to the logging system 210 or 216, along with the previously assigned activity identifier 208. This allows the logging systems 210 and 216 to track the assignment of activity identifiers by the different processing components of the protocol stacks, and to thereby identify related activity identifiers. The event logging systems 210 and 216 may in some embodiments create mappings of related activity identifiers so that event reporting tools may examine the mappings to determine which reported events relate to the same data packets or activities.

The reporting system or tool 120 may be used by analysts to view system behavior, and in particular to troubleshoot any failures in the handling of the data packet 206. The reporting system 120 may examine the event logs 214 and 218 produced by the logging systems 210 and 216 to find any events relating to a particular data packet. Events relating to a particular packet may be identified by referencing their activity identifiers. In some embodiments, all events relating to a particular data packet or activity will have the same activity identifier. In other environments, the reporting system 120 may refer to identifier mappings produced by the logging systems 210 and 216, to identify different activity identifiers that have been used in conjunction with a certain packet or activity, and may then find those events having the different but related activity identifiers. Furthermore, in situations in which an activity traverses more than two machines, the activity identifiers can be propagated and tracked through all of such machines, and the reporting system or tool 120 may generate an activity trace that includes logged events from any number of different machines, including both virtual and physical machines.

Figure 3A:
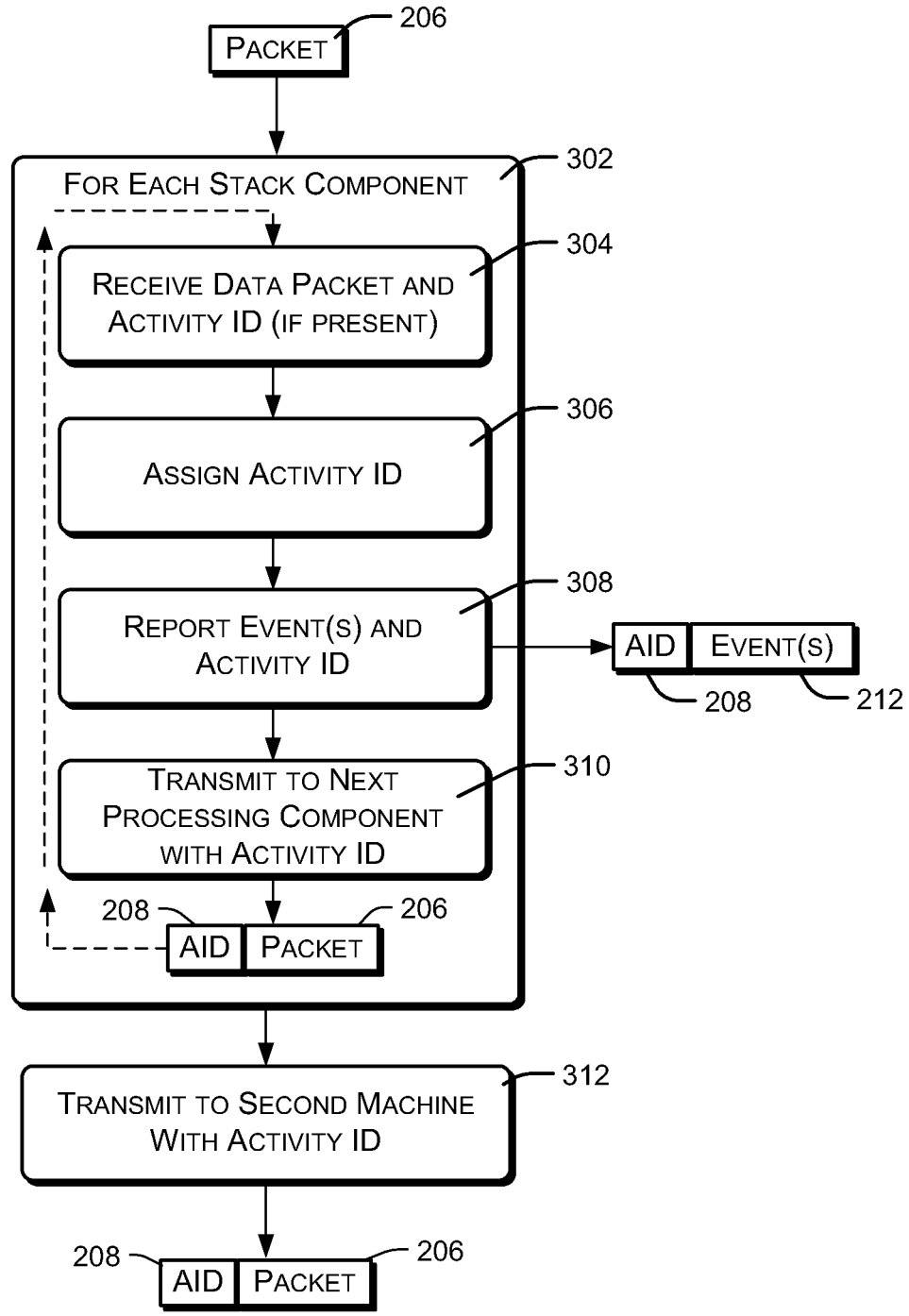
FIGS. 3A and 3B are flow diagrams illustrating protocol stack processing in a manner that facilitates event correlation.
Figure 3B:
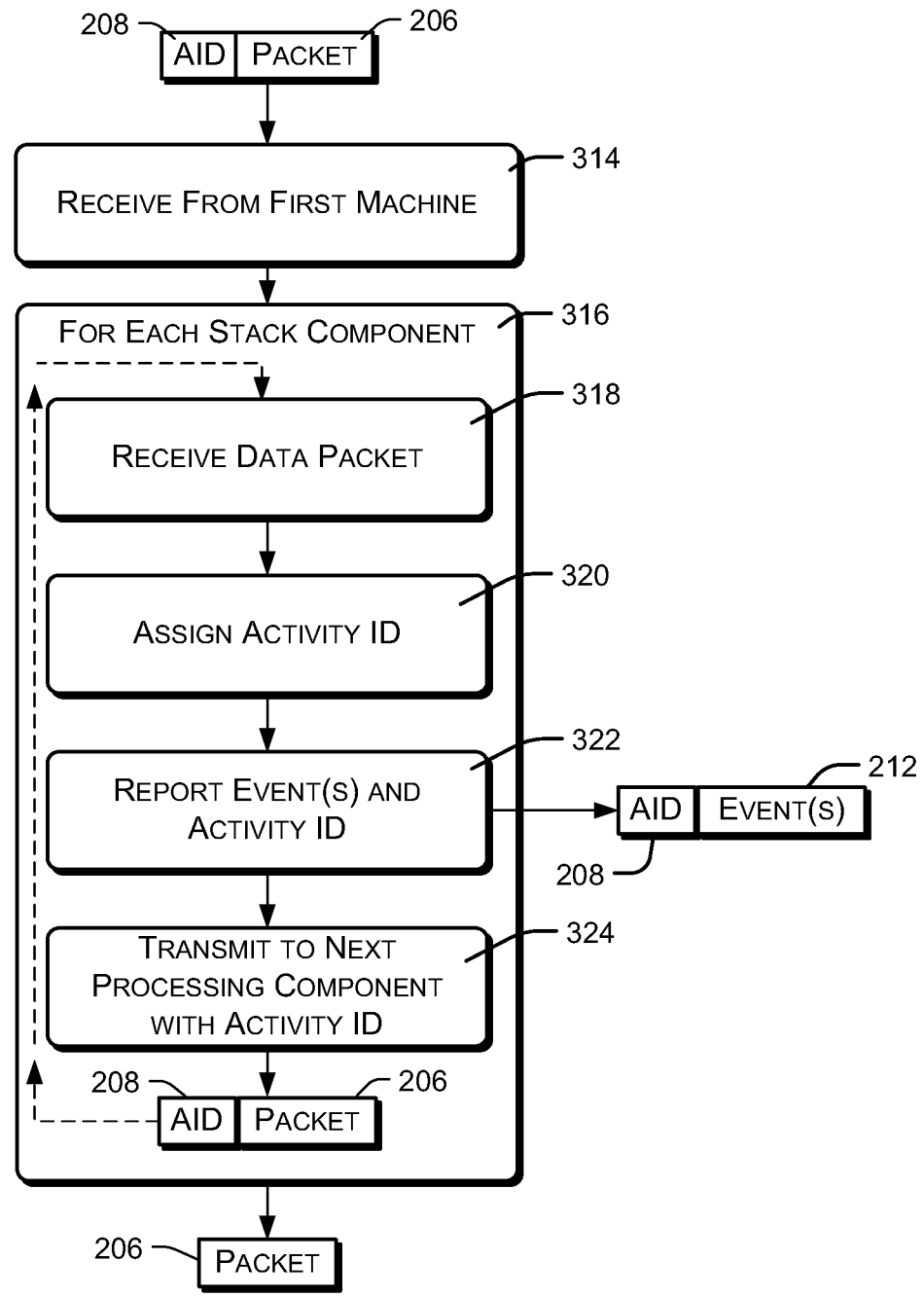

FIGS. 3A and 3B illustrate an example method of tracing events associated with a data packet or activity that is processed through two machines. FIG. 3A shows actions performed by the first of the machines. FIG. 3B shows actions performed by the second of the machines. The actions will be described with reference to the elements shown in FIG. 2. It is assumed for purposes of this description that the first machine implements the first protocol stack 202, and that the second machine implements the second protocol stack 204.

An action 302 comprises communicating the data packet 206 through the first protocol stack 202 and performing protocol-specific processing within each layer of the first protocol stack 202. As noted above, the first protocol stack 202 is implemented by a first machine, which may be either a virtual machine host, a virtual machine, or an independent physical machine. The action 302 comprises a set of actions that are performed for each of a series of processing components or layers of the first protocol stack 202, in addition to the protocol-specific processing performed by each processing component of the protocol stack 202.

An action 304 comprises receiving the data packet 206 and any activity identifier that has previously been associated with the data packet 206. If the currently executing stack processing component is at the highest level of the protocol stack 202, the data packet 206 may be received without a pre-existing activity identifier.

An action 306 comprises assigning an activity identifier 208 to the data packet 206 or to the activity with which the data packet is associated. If the activity identifier 208 has already been associated with the data packet 206 and received in the action 304, the same activity identifier 208 may be assigned in the action 306. Alternatively, a new activity identifier 208 may be created and assigned, and the creation and association of the new activity identifier may be reported to the logging system 210 of the first machine. In some embodiments, the packet 206 may be received with an existing activity identifier, and the processing component may nevertheless assign a new activity identifier to the packet 206. In this case, the processing component reports both the pre-existing activity identifier and the newly assigned activity identifier to the logging system 210, so that the logging system 210 can maintain a mapping or mappings of various activity identifiers that have been assigned to the processing of the data packet 206 by the different processing components of the protocol stacks.

An action 308 comprises reporting one or more events 212 to the logging system 210 of the first machine, wherein the reported events 212 relate to processing of the data packet 206 by the processing components of the first protocol stack 202. The activity identifier 208 is associated with each event 212 and reported along with the event 212. Other data may also be reported, such as descriptions, codes, timestamps, processor IDs, thread IDs, and so forth.

An action 310 comprises transmitting or providing the processed data packet 206 to the next processing component of the protocol stack 202. The activity identifier 208 is associated and included with the packet 206 as it is passed to the next processing component. The dashed flow lines of FIG. 3A indicate the possible repetition of the actions within the block 302, for subsequent layers of the protocol stack 202. This repetition repeats until the data packet has reached the lowest level of the first protocol stack 202.

After the packet 206 has been processed by the last or lowest-level layer of the protocol stack 202, an action 312 comprises transmitting the data packet 206 and associated activity identifier 208 to the second machine, or to the second protocol stack 204 of the second machine. The action 312 may be performed by the last or lowest-level layer of the protocol stack 202, such as by the Layer 1 of the protocol stack 202.

FIG. 3B shows actions that are performed with respect to the received packet 206 and associated activity identifier 208 by the second protocol stack 204. An action 314 comprises receiving the packet 206 and associated activity identifier 208. This action may be performed by the lowest-level layer of the second protocol stack 204, such as by the Layer 1 of the protocol stack 204.

An action 316 comprises communicating the data packet 206 through the second protocol stack 202 and performing protocol-specific processing within each layer of the second protocol stack 204. The second protocol stack 204 is implemented by a second machine, which may be either a virtual machine host, a virtual machine, or an independent physical machine. The action 316 comprises a set of actions that are performed for each of a series of processing components or layers of the second protocol stack 204, in addition to the protocol-specific processing performed by each processing component of the protocol stack 204.

An action 318 comprises receiving the data packet 206 and any activity identifier 208 that has previously been associated with the data packet 206. An action 320 comprises assigning an activity identifier 208 to the data packet 206 or to the activity with which the data packet is associated. The activity identifier 208 assigned here may be the same identifier that has already been associated with the data packet 206 and received in the action 318. Alternatively, a new activity identifier 208 may be created and assigned, and the creation and association of the new activity identifier may be reported to the logging system 216 of the second machine. In this case, the processing component reports both the pre-existing activity identifier and the newly assigned activity identifier to the logging system 216, so that the logging system 216 can maintain a mapping of various activity identifiers that have been assigned to the processing of the data packet 206 by the different processing components of the protocol stack 204.

An action 322 comprises reporting one or more events 212 to the logging system 216 of the second machine, wherein the reported events 212 relate to processing of the data packet 206 by the processing components of the second protocol stack 204. The activity identifier 208 is associated with each event 212 and reported along with the event 212.

An action 324 comprises transmitting or providing the processed data packet 206 to the next processing component of the protocol stack 204. The activity ID 208 is associated and included with the packet 206 as it is passed to the next processing component. The dashed flow lines of FIG. 3B indicate the possible repetition of the actions within the block 314, for subsequent layers of the protocol stack 204. This repetition repeats until the data packet has reached the highest level of the second protocol stack 204, at which point the packet 206 is delivered to its recipient application.

Figure 4:
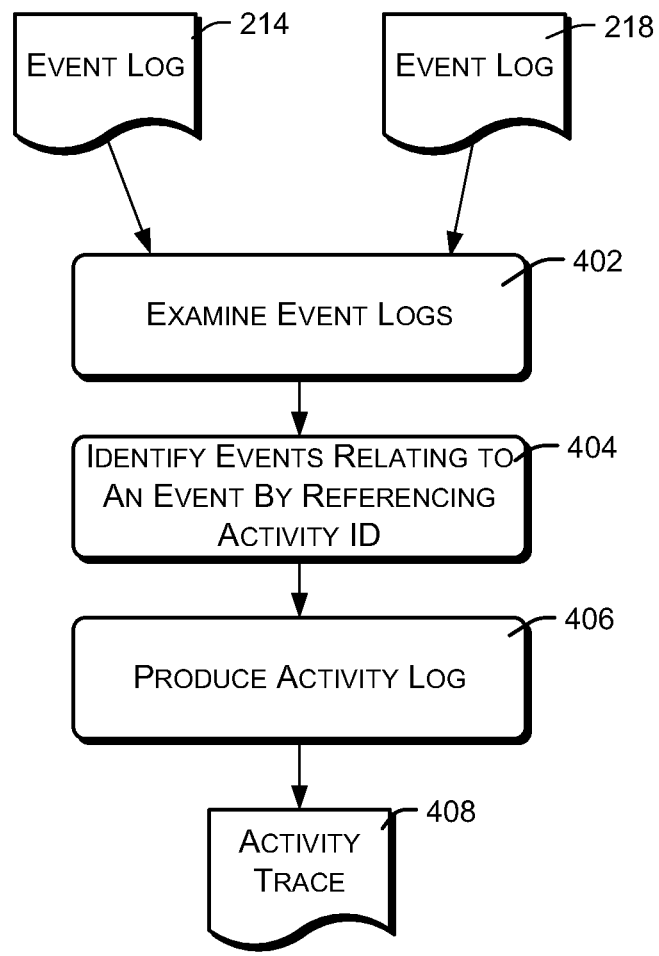
FIG. 4 is a flow diagram illustrating a method of reporting from multiple event logs.

FIG. 4 illustrates an example method of tracing log events in a virtual computing and/or multiple computer environment. The actions of FIG. 4 may be performed by the reporting system 120 that is discussed above with reference to FIGS. 1 and 2.

An action 402 comprises examining event logs from multiple machines, such as the event logs 214 and 218 shown in FIG. 2. As described above, the event logs specify events and corresponding activity identifiers. The activity identifiers correlate events to other events, and to specific data packets or activities to which the events relate.

An action 404 comprises identifying multiple events from the multiple machines that relate to a particular activity, by referencing the activity identifiers corresponding to the events in the event logs 214. More particularly, the reporting system 120 may locate all events having a common activity identifier. In other embodiments, the reporting system 120 may locate events having related activity identifiers. In order to identify related activity identifiers, the reporting system may examine one or more mappings that have been maintained by the logging systems 210 and 216.

An action 406 comprises producing an activity trace 408 based at least in part on the identified events that relate to the particular activity. The activity trace 408 may indicate all events relating to a particular activity or data packet, along with other information such as timelines, chronologies, packet payloads, descriptions, error messages, and other troubleshooting information.

Figure 5:
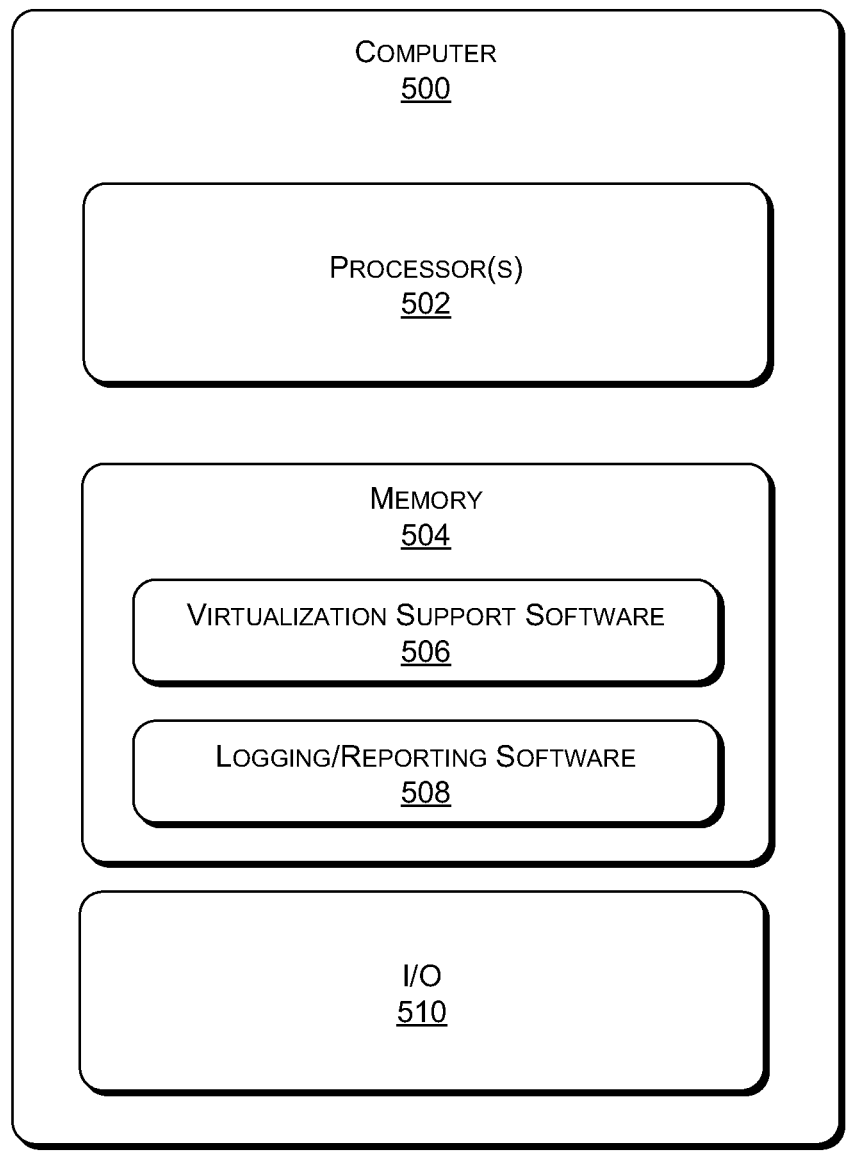
FIG. 5 is a block diagram of an example computer configuration that may be used to implement the techniques described herein.

FIG. 5 shows relevant high-level components of a computer 500, as an example of various types of computing equipment that may be used to implement the techniques described above. Each of the host machines 102, for example, may be implemented by a physical instance of the computer 500. A computer such as the computer 500 may also be used to implement the functionality of the reporting system 120.

The computer 500 may comprise one or more processors 502 and computer-readable memory 504. The logging and reporting techniques described above may be implemented as software residing within the computer-readable memory, such as one or more programs, modules, or routines, comprising sets or sequences of instructions that reside in the memory 504 for execution by the one or more processors 502. As high-level examples, the memory may contain virtualization support software 506 for supporting the operation of multiple 504 virtual machines within the computer 500. The memory 504 may also contain logging and/or reporting software 508 to support the logging and reporting functionality described above.

The memory 500 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The computer 500 may also have input/output facilities 510 such as network interfaces, user interfaces, and so forth.

Software used to implement the techniques described above may reside in the memory 504 as shown, and/or may also be stored and distributed in various ways and using different means, such as by storage on different types of computer-readable memory 504, including portable and removable media. The software may also be distributed by transmission from a repository, using a data network or other types of data computer communication systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

The invention claimed is:

1. In a virtual computing environment, a method comprising:
   within a host machine of a virtual machine, communicating a data packet through a first protocol stack, the first protocol stack comprising a first series of processing components;
   within the virtual machine, communicating the data packet through a second protocol stack, the second protocol stack comprising a second series of processing components;
   associating one or more activity identifiers with the data packet as it is communicated through the first and second protocol stacks;
   reporting events from the processing components of the first and second protocol stacks, the reported events relating to processing of the data packet by the processing components of the first and second protocol stacks;
   specifying the one or more activity identifiers with the reported events; and
   communicating between the host machine and the virtual machine at least one of the one or more activity identifiers with the data packet.

2. The method of claim 1, further comprising identifying events relating to a single data packet by referencing the one or more activity identifiers specified with the reported events.

3. The method of claim 1, further comprising correlating at least some of the reported events from the processing components of the first and second protocol stacks by referencing the one or more activity identifiers specified with the reported events.

4. The method of claim 1, further comprising:
   transmitting at least one of the one or more activity identifiers between adjacent processing components of the first protocol stack; and
   transmitting at least one of the activity identifiers between adjacent processing components of the second protocol stack.

5. The method of claim 1, wherein the reported events relate to processing exceptions encountered by the processing components of the first and second protocol stacks.

6. The method of claim 1, wherein the communicating between the host machine and the virtual machine further comprises communicating the data packet from the virtual machine to the host machine.

7. The method of claim 1, wherein the communicating between the host machine and the virtual machine further comprises communicating the data packet from host machine to the virtual machine.

8. A method comprising:
   communicating data packets between a first machine and second machine;
   within the first machine, communicating each data packet through a series of processing components;
   reporting log events relating to the data packets from individual ones of the series of processing components;
   correlating the reported log events with the data packets;
   when communicating an individual data packet of the data packets between the first and second machines, associating an activity identifier with the individual data packet; and
   reporting the activity identifier to link reported log events of the second machine with reported log events correlated to the individual data packet in the first machine.

9. The method of claim 8, wherein the correlating comprises associating the activity identifier with at least one of the log events relating to the individual data packet when reporting the at least one of the log events.

10. The method of claim 8, further comprising identifying log events from the first and second machines relating to the individual data packet based on activity identifiers associated with the reported log events.

11. The method of claim 8, further comprising identifying log events relating to the individual data packet based on activity identifiers associated with the reported log events.

12. The method of claim 8, wherein at least one of the first and second machines is a virtual machine.

13. The method of claim 8, wherein at least one of the first and second machines is a virtual machine host.

14. The method of claim 8, wherein the first and second machines comprise at least two physical machines that communicate over a physical communications network.

15. A method comprising;
   examining event logs from multiple machines, wherein the event logs specify events and corresponding activity identifiers;
   identifying events from the multiple machines that relate to a particular activity by referencing the activity identifiers corresponding to the events, wherein the identifying comprises locating events from the multiple machines having a common activity identifier; and
   producing an activity trace based at least in part on the identified events that relate to the particular activity.

16. The method of claim 15, wherein the identifying comprises locating events from the multiple machines having related activity identifiers.

17. The method of claim 15, wherein the identified events that relate to the particular activity have a common activity identifier and the identifying comprises locating events from the multiple machines having the common activity identifier.

18. The method of claim 15, wherein at least one of the activity identifiers is common to events reported by two or more of the multiple machines.

19. The method of claim 15, wherein the activity trace includes events from a plurality of the multiple machines.

20. The method of claim 15, wherein the activity trace includes at least one of packet payload information, event descriptions and error messages.

* * * * *